(12) United States Patent
Emamjomeh et al.

(10) Patent No.: US 10,293,606 B2
(45) Date of Patent: May 21, 2019

(54) INKJET PRINTING

(71) Applicant: Hewlett-Packard Development Company, L.P., Fort Collins, CO (US)

(72) Inventors: Ali Emamjomeh, San Diego, CA (US); Elizabeth Ann Visnyak, San Diego, CA (US); George Sarkisian, San Diego, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 26 days.

(21) Appl. No.: 15/106,614

(22) PCT Filed: Jan. 21, 2014

(86) PCT No.: PCT/US2014/012279
§ 371 (c)(1),
(2) Date: Jun. 20, 2016

(87) PCT Pub. No.: WO2015/112115
PCT Pub. Date: Jul. 30, 2015

(65) Prior Publication Data
US 2017/0028718 A1    Feb. 2, 2017

(51) Int. Cl.
*B41J 2/14*    (2006.01)
*B41J 2/21*    (2006.01)
(Continued)

(52) U.S. Cl.
CPC .............. *B41J 2/14* (2013.01); *B41J 2/2114* (2013.01); *B41J 11/0015* (2013.01);
(Continued)

(58) Field of Classification Search
None
See application file for complete search history.

(56) References Cited

U.S. PATENT DOCUMENTS 6,498,202 B1 * 12/2002 Sun .................. C09D 11/30
347/100
6,779,884 B1    8/2004 Ma et al.
(Continued)

FOREIGN PATENT DOCUMENTS

JP    2011132646    7/2011

OTHER PUBLICATIONS

Extended European Search Report dated Oct. 20, 2016 for PCT/US2014/012279, Applicant Hewlett-Packard Development Company, L.P.
(Continued)

*Primary Examiner* — Alejandro Valencia
(74) *Attorney, Agent, or Firm* — Thorpe North & Western LLP

(57) ABSTRACT

An inkjet printing system is described herein. In an implementation, the inkjet printing system includes a fixer dispensing unit for applying a fixer composition on a substrate and an ink dispensing unit for applying an ink composition on the substrate. The fixer composition includes a metal salt in a range of about 5% to 10% by weight. Further, the ink composition includes a liquid vehicle having a non-volatile organic solvent, a colorant dispersed in the liquid vehicle, and a latex binder dispersed in the liquid vehicle.

12 Claims, 4 Drawing Sheets

(51) Int. Cl.
  *B41J 11/00* (2006.01)
  *B41M 5/00* (2006.01)
  *B41M 7/00* (2006.01)
  *C09D 11/106* (2014.01)
  *C09D 11/322* (2014.01)
  *C09D 11/40* (2014.01)
  *C09D 11/54* (2014.01)

(52) U.S. Cl.
  CPC .......... *B41M 5/0017* (2013.01); *B41M 7/009* (2013.01); *C09D 11/106* (2013.01); *C09D 11/322* (2013.01); *C09D 11/40* (2013.01); *C09D 11/54* (2013.01)

(56) References Cited

U.S. PATENT DOCUMENTS

| | | |
|---|---|---|
| 8,012,551 B2 | 9/2011 | Song et al. |
| 8,304,043 B2 | 11/2012 | Nagashima et al. |
| 8,425,031 B2 | 4/2013 | Ohshima et al. |
| 2005/0231573 A1 | 10/2005 | Bruinsma et al. |
| 2006/0023044 A1 | 2/2006 | Bauer |
| 2007/0225401 A1 | 9/2007 | Sarkisian et al. |
| 2010/0247874 A1* | 9/2010 | Ishihara ............. C09D 11/0235 428/195.1 |
| 2011/0279554 A1 | 11/2011 | Dannhauser et al. |
| 2011/0304661 A1 | 12/2011 | Emamjomeh et al. |
| 2012/0114880 A1 | 5/2012 | Nagoshi et al. |
| 2012/0314000 A1* | 12/2012 | Sarkisian ............. B41M 5/0017 347/21 |
| 2013/0044157 A1 | 2/2013 | Sarkisian et al. |
| 2013/0076842 A1 | 3/2013 | Sarkisian et al. |

OTHER PUBLICATIONS

International Search Report dated Oct. 27, 2014 for PCT/US2014/012279, Applicant Hewlett-Packard Development Company, L.P.

* cited by examiner

INKJET PRINTING

BACKGROUND

Inkjet printing is a widely used printing technique which employs a non-impact process for precisely delivering small volumes of ink on a printing substrate, such as paper. One type of inkjet printing process, referred to as drop-on-demand inkjet printing, intermittently delivers the ink for printing. The techniques for delivering the ink in such cases may include use of piezoelectricity or heat in a printing nozzle for regulating the ejection of ink from the printing nozzle.

The inks used in inkjet printing generally include a liquid vehicle or a solvent and a colorant. In addition, to obtain a durable print, the ink may include certain other additives, such as surfactants and durability resins. The quality and durability of print and the speed of printing is usually dependent on the additives used in the ink.

BRIEF DESCRIPTION OF DRAWINGS

The detailed description is described with reference to the accompanying figures. In the figures, the left-most digit(s) of a reference number identifies the figure in which the reference number first appears. The same numbers are used throughout the figures to reference like features and components.

DETAILED DESCRIPTION

Figure 1A:
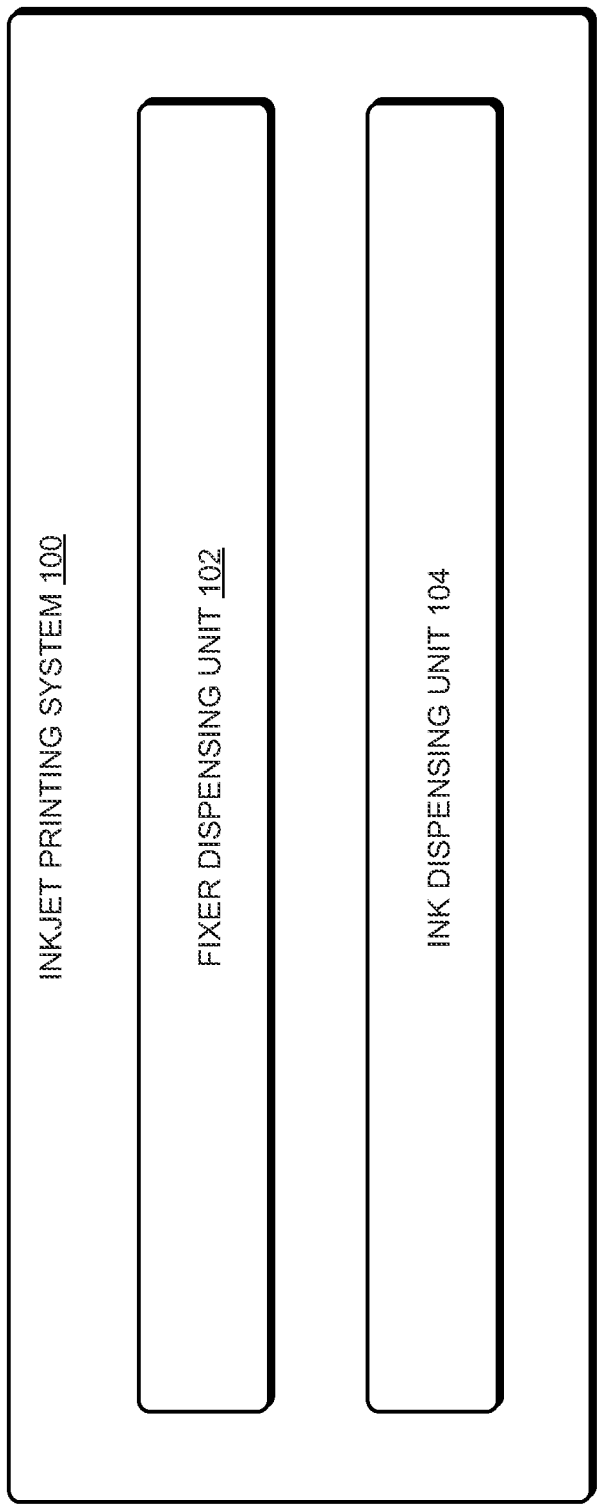
FIG. 1A illustrates a schematic of an inkjet printing system, in accordance with an implementation of the present subject matter.

The durability and quality of print and the speed of printing in an inkjet printing system is based on various factors, including composition of ink used for printing and a substrate used for printing. In an example, when paper is used as the substrate, bleeding of colors may occur, say due to migration of colorant pigments on the surface of the paper. In order to avoid this, generally, a fixing fluid is applied on the surface of the paper to control migration of the colorant pigments.

In certain other cases, say in industrial printing applications for printing large-sized posters, wallpapers, or advertisement banners, other types of substrate may be employed. For example, in industrial applications, slow-absorbing printing media, say coated offset paper or vinyl substrates, can be employed owing to the low cost of such media. Such media is generally employed for slow-speed printing and may involve multiple passes of the medium in the inkjet printing system to obtain a durable print. Therefore, the printing speed achieved using such media is decreased. When used for high speed printing, say at 400 feet per minute (fpm) to 1000 fpm, such media do not provide a good quality of print and may suffer from running of colors of the print. In addition, in few cases, using the fixing fluid may not adequately alleviate the bleeding of colors of the print on such media.

Accordingly, for enhancing the durability of the print for high speed printing, usually, a durability resin, such as a latex resin, can be dissolved or dispersed in a dispersion medium in the ink, in addition to colorants. For instance, such durability resins can include soluble latex resins, soluble polyurethane (PU) resins, soluble styrene-acrylic resins, or dispersed latex or PU resins. The durability resin can protect the print from being smeared during printing, and hence, enhance mechability of the print. However, the type and amount of durability resins that can be used in the ink is dependent on the colorants used in the ink. For instance, the presence of durability resins along with the colorants may affect operation of a printing nozzle of the inkjet printing system, such as a thermal inkjet printer. Additionally, in certain situations, say in case a glass transition temperature of the durability resin is low, the durability resin may solidify in the printing nozzle, thereby blocking the printing nozzle. In few other situations, in which the solubility of the resin is poor in water, the resin may flocculate easily and separate from the ink. In such a case, continuous operation of the printing nozzle can create shear effects on the resin, thereby destabilizing the ink and causing separation of the resin. As a result, such inks may be unusable for high speed printing, as the printing nozzle may have to be operated intermittently to prevent the resins from separating from the ink.

Further, in certain cases, to enhance the quality of prints the dispersion medium can include high volatile organic compound (VOC) solvents. Such solvents can facilitate drying of the durability resins and, therefore, enhance mechability of the print. However, the high VOC solvents are generally toxic and can affect operation of the printing nozzle of the inkjet printing system. Therefore, when the high VOC solvents are used in the ink, the printing nozzle has to be frequently serviced, say every 10 to 15 seconds, thereby slowing down the printing process considerably. For instance, the printing nozzle has to be frequently cleaned or wiped for keeping the nozzle operational. In addition, the high VOC solvents, being toxic in nature, are not environment friendly and are harmful in general.

In certain other inkjet printing processes, to obtain a long-lasting and good quality print at high printing speeds on the printing substrate, say slow absorbing printing medium or printing medium of hydrophobic nature, the printing substrate can be pre-processed for printing. In such cases, the printing substrate can be pre-treated by coating with a pre-treatment fluid before the ink is sprayed on the printing substrate. The pre-treatment fluid can include a mixture of metal salts and the durability resin dispersed in a solvent. However, pre-treating the printing substrate involves use of elaborate equipment which considerably affects the cost of printing. In addition, in few cases, the pre-treatment coating has to be dried on the printing medium, before the printing substrate can be used further for printing. As a result, the printing procedure involving pre-treatment of the printing medium can be time-consuming and tedious. Further, the prints obtained from such two-stage processes has poor wet rub durability and the print is usually in a dull or matt finish, even in cases where a glossy finish is expected.

Few other techniques have been developed to enhance the finish quality of the prints obtained from the above mentioned two-stage printing procedure. Such techniques involve a post-treatment procedure to be performed on the prints obtained from two-stage printing procedure. However, for using the post-treatment procedure, an additional printing nozzle has to be added to the printing system used for two-stage printing. Therefore, the cost of the printing system increases.

The present subject matter discloses an inkjet printing system and a method of printing in an inkjet printing system, according to an implementation. In an implementation, the inkjet printing system can be a two-stage inkjet printing system including a fixer dispensing unit for dispensing a fixer composition and an ink dispensing unit for dispensing an ink composition on the substrate during printing. Further, the inkjet printing system can include a drying unit for drying the print on the substrate once the fixer composition and the ink composition are applied thereon.

In an example, the fixer dispensing unit can include a fixer reservoir to store the fixer composition and a fixer nozzle to eject the fixer composition on the substrate during printing. In said example, the ink dispensing unit can have a structure similar to the fixer dispensing unit, and can include an ink reservoir to store the ink composition and an ink nozzle to eject the ink composition on the substrate for printing. In one case, the fixer dispensing unit can be provided upstream of the ink dispensing unit. In such a case, the fixer composition may be applied on the substrate before the application of the ink composition.

During operation of the inkjet printing system, the fixer dispensing unit applies the fixer composition on the substrate and, while the fixer is wet, the ink dispensing unit dispenses the ink composition on the substrate. The substrate is subsequently dried to obtain a print. Therefore, the ink and fixer composition according to the present subject matter can be used in wet-on-wet printing technique. Since the coating of the fixer composition may not have to be dried before the ink composition can be applied thereon, a considerably high speed of printing can be achieved.

In an example, the ink composition is formed as having a liquid vehicle which serves as a dispersion medium. The liquid vehicle can have one or more colorants and a latex binder dispersed therein. The ink composition when used along with the fixer composition facilitates in effective operation of the inkjet printing system and in achieving good quality prints with high speed printing.

According to an aspect, constituents of the fixer composition aid in achieving high quality prints from the inkjet printing system when the fixer composition is used along with the ink composition for high speed printing. In one case, the fixer composition can include a metal salt dispersed in a fixer liquid vehicle. In one case, the metal salt can be a polyvalent metal salt. For instance, the metal salt can be a calcium salt, say calcium propionate $(Ca(C_2H_5COO)_2)$. According to an aspect, the fixer composition can include about 5% to 10% of the metal salt by weight. In an example, the amount of metal salt in the fixer composition can be about 7% to 9% by weight.

When the ink composition is used in conjunction with the fixer composition, flocculation of the colorant in the ink takes place which controls migration or bleeding of the colors of print. As a result, fast colors and good quality of the print are obtained. In an example, in case the metal salt is in a range of about 7% to 9% by weight, the time taken for the colorant in the ink to flocculate may be less than about 0.1 seconds. As a result, the combination of the ink and fixer compositions can be used for high speed printing in inkjet printing systems.

In addition, the fixer composition can have a pH value in a range of about 6 to 6.6. In an example, a pH value of below 7 facilitates the metal salts in the fixer composition to rapidly react with the colorants in the ink. The pH value of the fixer composition in the above mentioned range allows the flocculation of the colorants to take place quickly. Therefore, as mentioned above, the combination of the ink and fixer compositions can be used for high speed printing in the inkjet printing systems for a variety of substrates including slow-absorbing printing media, such as coated offset media or other semi-porous media. For instance, the ink and fixer composition can allow use of inexpensive, off-the-shelf slow-absorbing printing media for high speed and high quality printing.

For example, in accordance with the present subject matter, the inkjet printing system can have a printing speed of about 1000 feet per minute (fpm), and can provide a durable and smear-resistant print which has a glossy texture and water fast colors. In one case, the inkjet printing system can achieve printing speeds in the range of about 100 fpm to 1000 fpm with the ink composition and the fixer composition used in the manner described above, without compromising on the quality or durability of the print. Further, the print has resistance to dry rub and wet rub, and is durable when put under tape adhesion tests.

Further, according to an aspect, durability of the prints may be enhanced by the properties of the latex binder in the ink composition. According to an implementation, a glass transition temperature of the latex binder is in a range of about 50° C. to 110° C. In another example, the glass transition temperature of the latex binder is in a range of about 60° C. to 80° C.

With the glass transition temperature within such a range, the latex binder does not form a film in the ink nozzle of the inkjet printing system and, therefore, provides for a convenient printing procedure. In addition, when applied on the substrate during printing, the latex binder is provided with an adequate amount of time, say in the range of about 2 to 5 seconds or less, to form a film over the colorants on the substrate, so as to mix with the colorants, thereby achieving a durable print with substantially high mechabilty. In such a case, while internal portions of the print may still be soft and wet, the film formed on the surface does not smear. As a result, the constituents of the ink, such as the solvents, are unable to escape and are trapped underneath the matrix formed by the latex film, providing a mechable print.

In an example, the latex binder can form the film on the substrate at the glass transition temperature when particles of the latex binder are in contact with each other, and about 70% of the liquid vehicle of the ink has dried. The above mentioned range of the glass transition temperatures of the latex binder facilitates in the effective formation of the film on the substrate. Further, the above mentioned range of glass transition temperature minimizes fusion of the latex in the printing nozzle during firing, thereby preventing clogging of the printing nozzle. Therefore, the operation of the printing nozzle is reliable and continuous of considerably long durations.

Additionally, with such film-forming property of the latex binder, the ink composition may not include a toxic volatile solvent, which is otherwise included to facilitate drying of the latex binder. In an implementation, the liquid vehicle of the ink composition can include non-volatile organic solvents. Accordingly, in an example, the liquid vehicle can be formed of distilled water as a solvent and can further include a non-volatile organic compound (non-VOC) solvent as a co-solvent. In an example, the non-VOC solvent can be 2HE2P (2-hydroxyethyl-2-pyrrolidone) solvent. Therefore, the ink composition of the present subject matter has low toxicity and is environment friendly. In addition, the non-volatile organic solvent may not affect the performance of the ink nozzle of the printing system and the ink nozzle can, therefore, be used for continuous operation for longer durations, in the range of a few hours, without servicing. In one example, the ink nozzle may be used for about 3 hours without servicing or wiping the ink nozzle.

In addition, the acid number of the latex binder can help in determining the quality of print when the ink composition of the present subject matter is used along with the fixer composition as above. In an example, acid number refers to a parameter measured for the latex binder based on conductivity titration of the latent acid functions of the latex binder with nitric acid, and can be indicative of an acid functionality of the latex binder. As an example, a sample for which the acid number is measured is made strongly basic with potassium hydroxide (KOH) and then is titrated with 1% of nitric acid ($HNO_3$). Accordingly, the acid number is measured in terms of milligram (mg) of KOH per gram (g) of the latex binder.

In an implementation, the latex binder can have an acid number in range of about 0 to 20. When the latex binder has the acid value within the above mentioned range, the latex binder does not interfere with the fixer composition, say with the metal salt in the fixer composition during printing. Interference of the latex binder with the metal salt may otherwise lead to the formation of a clouded or unclear film on drying of the latex binder. Therefore, in case of the present subject matter, a clear and glossy film can be formed by the latex binder upon drying. In addition, since the latex binder does not interfere with the fixer composition, the effective flocculation of the colorants can take place for good print quality and fastness of the colors in the print. In another example, in order to achieve such quality of prints, the acid number of the latex binder can be in a range of about 3 to 10.

According to an example, the latex binder can have a particle size in a range of about 120 nanometer (nm) to 190 nm. In another example, the particle size of the latex binder can be in a range of about 160 nm to 190 nm. The particle size of the latex binder can determine the effectiveness of the printing operation and the contribution of the latex binder in forming a durable and smear resistant print on the substrate. For example, in case the particle size is small, say less than 120 nm, the latex binder can melt and form the film in the ink nozzle, thereby leading to clogging of the ink nozzle. On the other hand, in case the particle size of the latex binder is large, the large-sized particles may cause a settle in the printing nozzle. As a result, the ink may have to be stirred continually during operation. In addition, the large-sized particles take a substantially long time for forming the film and are unable to provide a mechable the print. With the above mentioned particle sizes, the binder can be effectively used in inkjet printing systems to obtain substantially high quality and durable prints.

The above described inkjet printing system and method for printing therein are further described with reference to FIGS. 1 to 3. It should be noted that the description and figures merely illustrate the principles of the present subject matter. Therefore, various arrangements can be devised that, although not explicitly described or shown herein, embody the principles of the present subject matter. Moreover, all statements herein reciting principles, aspects, and implementations of the present subject matter, as well as examples thereof, are intended to encompass equivalents thereof.

Figure 2:
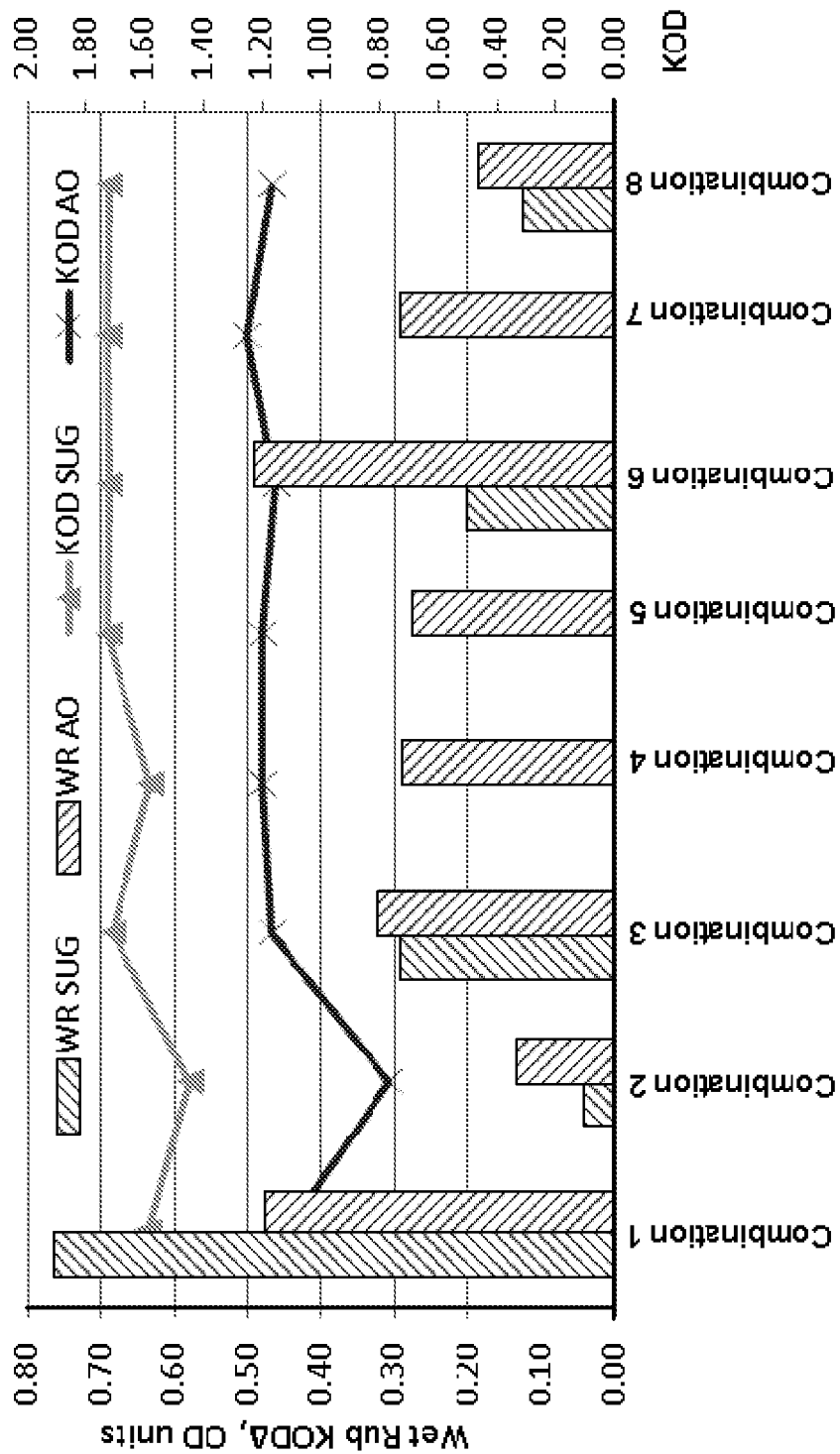
FIG. 2 illustrates a graph showing a comparison of performance characteristics of prints obtained using different ink compositions and fixer compositions, in accordance with an implementation of the present subject matter.

FIG. 1A illustrates a schematic of an inkjet printing system 100, according to an implementation of the present subject matter. In an example, the inkjet printing system 100 can be a two-stage printing system having a fixer dispensing unit 102 and an ink dispensing unit 104, and can be used for web printing, i.e., for printing on a continuous substrate web. The fixer dispensing unit 102 and the ink dispensing unit 104, collectively referred to as a print-head, can dispense the fixer composition and the ink composition, respectively, as disclosed in the present subject matter, for achieving high speed printing with durable quality of prints. According to an aspect, the ink dispensing unit 104 can be provided downstream with respect to the fixer dispensing unit 102. In an example, the inkjet printing system 100 can achieve glossy and durable prints, which are substantially resistant to wet rub, dry rub, and smearing, at speeds in a range of about 100 feet per minute (fpm) to 1000 fpm.

In one case, the inkjet printing system 100 can be thermal inkjet printing system which involves use of heat for achieving ejection of the fixer composition and the ink composition from the fixer dispensing unit 102 and the ink dispensing unit 104, respectively. In another case, the inkjet printing system 100 can be a charge controlled printing system in which electrostatic attraction is used for ejecting the fixer composition from the fixer dispensing unit 102 and ink composition from the ink dispensing unit 104. In yet another case, the inkjet printing system 100 can use vibration pressure generated by a piezoelectric element for ejecting ink composition and fixer composition. In still another example, the inkjet printing system 100 can use an acoustic technique for ejection of the two compositions. In this case, an electric signal is transformed into an acoustic beam and the compositions are irradiated by the acoustic beam so as to be ejected by radiation pressure. The inkjet printing system 100 can use a combination of the above mentioned techniques for ejection of the ink and fixer compositions. For example, the fixer dispensing unit 102 can use one of the above mentioned techniques for dispensing the fixer and the ink dispensing unit 104 can use another above mentioned technique for dispensing the ink.

Figure 1B:
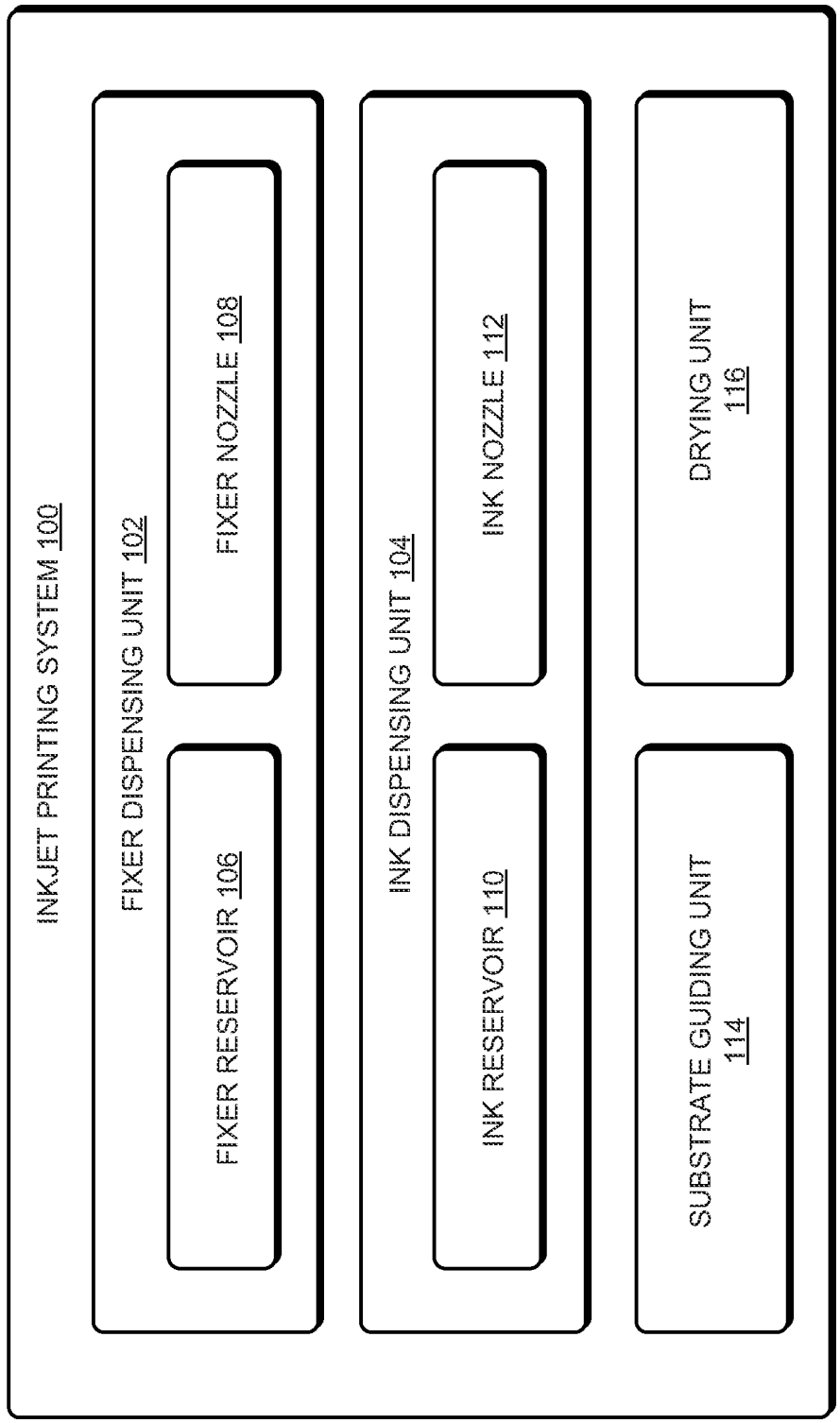
FIG. 1B illustrates a schematic of the inkjet printing system showing various components of the inkjet printing system, in accordance with an implementation of the present subject matter.

FIG. 1B shows various components of the inkjet printing system 100, in accordance with an implementation of the present subject matter. In said implementation, the fixer dispensing unit 102 can include a fixer reservoir 106 for storing the fixer composition and a fixer nozzle 108 for ejecting the fixer composition on a substrate during printing. Similarly, in said implementation, the ink dispensing unit 104 can include an ink reservoir 110 for storing the ink composition and an ink nozzle 112 for ejecting the ink composition on the substrate. Further, any of the composition ejection techniques described above may be employed with the fixer nozzle 108 and the ink nozzle 112.

Further, the inkjet printing system 100 can include a substrate guiding unit 114 for handling the substrate web during printing and a drying unit 116 for drying the fixer and ink compositions applied on the substrate web.

In one case, the substrate guiding unit 114 can include a web mounting spool on which a substrate web is mounted. In addition, the substrate guiding unit 114 can include a puller assembly and a plurality of web guides. The puller assembly can continuously pull the substrate web from the web mounting spool, during printing operation of the inkjet printing system 100. In one case, the puller assembly can include a pair of contact rollers having an anti-friction coating, say rubber coating, thereon. The substrate web can pass through the pair of contact rollers and be pulled by the rotational motion of the rollers. Further, the puller assembly can be provided downstream with respect to the fixer dispensing unit 102 and the ink dispensing unit 104. The plurality of web guides can support the substrate web and maintain adequate tension in the substrate web, during the movement of the substrate web for printing. In an example, the plurality of guides can include adjustable rollers for adjusting the tension in the substrate web for effective operation.

In one example, the drying unit 116 can be an air-dryer for blow-drying the print on the substrate. In such a case, the drying unit 116 can have an air circulation device, say a fan, for creating air flow, a heating element for heating the air, and one or more air channels for directing the hot air towards the substrate with the wet print thereon. In another example, the drying unit 116 can simply be formed by one or more heating elements. In such a case, the substrate with the wet print can be passed in vicinity of the heating elements for facilitating the drying of the wet print.

In operation, the substrate guiding unit 114 can provide for continuous running of the substrate web under the print-head. According to an aspect, the fixer dispensing unit 102 applies the fixer composition on the substrate web and, while the fixer is wet, the ink dispensing unit 104 dispenses the ink composition on the substrate. The inkjet printing system 100, therefore, in such a case, can use wet-on-wet printing technique for printing on the substrate.

The ink composition is formed of a liquid vehicle having a latex binder and one or more colorants dispersed therein. Further, the fixer composition includes a fixer liquid vehicle having a metal salt dispersed therein. As explained previously, the properties of the ink composition and the fixer combination allow for the wet-on-wet printing technique to be used for printing and obtaining a durable print of good quality. In an example, the time taken for the colorant in the ink composition to flocculate is in the range of about 0.1 seconds when used with the fixer having about 7% to 9% of the metal salt by weight. Therefore, the ink and fixer compositions can be used for wet-on-wet printing.

Subsequent to the application of the fixer composition and the ink composition on the substrate, the drying unit 116 can dry the print. In an example, the drying unit 116 can provide a temperature of around 70° C. for drying the print on the substrate. In such a case, the latex binder can get an adequate amount of time to form a film over the colorants and mix with the colorants on the substrate, to achieve a durable print with substantially high mechabilty. For instance, the latex binder can form the film on the substrate when particles of the latex binder are in contact with each other, and a substantial amount of water, say about 70%, in the ink composition has dried. According to an aspect, the glass transition temperature of the latex binder, in the range of about 50° C. to 110° C., and in certain cases, in the range of about 60° C. to 80° C., allows the latex binder to effectively form a film and provide for good quality finish of the prints.

The ink composition, as mentioned above, is formed of a liquid vehicle having distilled water as a solvent and a non-volatile organic as a co-solvent. In one example, the distilled water can be deionized distilled water. Further, in one instance, solvents that have a boiling point greater than about 285° C. are termed as non-volatile solvents. As explained previously, the ink composition does not include a toxic volatile solvent, which is otherwise included to facilitate drying of the latex binder, and can use a non-volatile organic solvent instead because of the above mentioned film-forming properties of the latex binder.

In an example, the non-VOC solvent can be a non-VOC decap solvent, such as 2HE2P (2-hydroxyethyl-2-pyrrolidone) solvent, for preventing drying of the ink composition in the ink nozzle. The term "decap," as referred to herein, means the ability of the ink composition to be readily ejected from the ink nozzle, say upon prolonged exposure to air. In other cases, the non-VOC solvent can be tetraethylene glycol, Dantacol® DHE, or pentanetriol. In still other examples, the solvent can be glycerol polyoxyethyl ether, tripropylene glycol, 1-(2-hydroxyethyl)-2-imidazolidinone, 1-(2-hydroxyethyl)-2-pyrrolidone, 1,6-hexanediol, 1,2,6 hexanetriol, trimethylolpropane, dipropylene glycol, or combination(s) thereof. In one example, the ink composition can include about 1% to 15% of the non-VOC solvent by weight. For instance, in one case, the ink composition can include about 8% to 12% of the non-VOC solvent by weight. Further, the non-VOC solvent can be a hydrophilic compound, i.e., the non-VOC solvent can be soluble in water.

Additionally, the liquid vehicle can include a surfactant for controlling a surface tension of the ink composition. Accordingly, the surfactant can adequately wet the surface of the substrate and promote ink dot gain when applied during printing, for obtaining good quality prints. In one example, the surfactant can be Tegowet® 510 surfactant. In other examples, the surfactant can be Surfynol® SEF, Tergitol® 15s5, or Surfynol® 104.

In other cases, surfactants that can be used can include non-ionic or anionic surfactants. Suitable nonionic surfactants can include, but are not limited to ethoxylated alcohols, fluorinated surfactants, 2-diglycol surfactants, or a combination thereof. For example, non-ionic surfactants can include surfactants from the Surfynol® series, say Surfynol® CT21 1 and Surfynol® SEF. Further, anionic surfactants for the ink composition can include surfactants of the DoWfax® family, say DoWfax® 8390; anionic Zonyl® surfactants, say Zonyl® FSA; phosphate ester surfactants including the surfactants of the Emphos® series and the DeDophoS® series; the surfactants of the Crodafos® series; the surfactants of the Dephotrope® series and of the DePHOS® series; alkyl sulfates, say lauryl sulfate; alkyl ether sulfates, say sodium laureth sulfate; N-lauroyl sarcosinate; and dodecyl-benzene sulfonate; or combinations thereof. Further, the ink composition can include about 0.05% to 1% of the surfactant by weight. In one case, the ink composition can include about 0.2% to 0.6% of the surfactant by weight.

In addition to the above compounds, the liquid vehicle may include one or more of wetting agents, de-foamers, polymers, organic compounds, biocides sequestering agents, viscosity modifiers, surface-active agents, chelating agents, resins, or a combination thereof, to enhance various properties of the ink composition.

Further, as mentioned previously, the latex and the colorant are dispersed in the ink composition. According to an aspect, the ink composition can include about 1% to 10% of the latex binder by weight. In one case, the ink composition can include about 1.5% to 6% of the latex binder by weight. In an example, the latex binder can be a cationic resin. The term latex refers herein to a group of preparations having stable dispersions of polymeric micro-particles dispersed in a liquid vehicle. In some examples, in the composition the latex binder is present in the form of dispersed latex binder particles. In addition, the latex binder can be a polymeric resin. For instance, the latex binder can be made of one or more acrylic polymers or copolymers, vinyl acetate polymers or copolymers, polyester polymers or copolymers, vinylidene chloride polymers or copolymers, butadiene polymers or copolymers, styrene-butadiene polymers or copolymers, acrylonitrile-butadiene polymers or copolymers. In other examples, the latex binder can be a component containing particles of a vinyl acetate-based polymer, an acrylic polymer, a styrene polymer, an SBR-based polymer, a polyester-based polymer, or a vinyl chloride-based polymer. In additional examples, the latex binder can be a polymer or a copolymer of acrylic polymers, vinyl-acrylic copolymers and acrylic-polyurethane copolymers. Further, the latex binder can be formed as a co-polymer of any two or more of the above mentioned substances. For example, the latex binder can be a co-polymer of a styrene polymer and an acrylic monomer having the glass transition temperature in the range of about 60° C. to 80° C.

Further, the colorant, according to an example, the ink composition can include an amount of about 0.5% to 6% of the colorant by weight. In one case, the ink composition can include about 1% to 4% of the colorant by weight. The colorant in the ink composition can be either in the form of pigments, dyes, or a combination thereof. As used herein, "pigment" refers to a colorant particle that is substantially insoluble in the liquid vehicle in which it is used. Pigments can be dispersed using a separate dispersing agent, or can be self-dispersed, having a dispersing agent attached to the surface of the pigment.

In an example, the colorant can be black pigment. In other examples, the colorant can include a yellow colorant, a magenta colorant, a cyan colorant, a black colorant, a blue colorant, an orange colorant, a green colorant, a pink colorant, or combinations thereof, each selected from a pigment, a dye or a combination thereof. Examples of suitable organic pigments can include azo pigments, such as diazo pigments and monoazo pigments; polycyclic pigments, say phthalocyanine pigments. Such phthalocyanine pigments can include phthalocyanine blues and phthalocyanine greens, perylene pigments, perynone pigments, anthraquinone pigments, quinacridone pigments, dioxazine pigments, thioindigo pigments, isoindolinone pigments, pyranthrone pigments, and quinophthalone pigments; insoluble dye chelates, such as basic dye type chelates and acidic dye type chelates; nitropigments; nitroso pigments; and anthanthrone pigments, such as PR168.

Additionally, in an example, the fixer liquid vehicle of the fixer composition can be formed as non volatile dispersing medium. In such a case, the fixer liquid vehicle can include distilled water, non-VOC solvents, or a combination thereof. In one example, the distilled water can be deionized distilled water. The solvent can be included for preventing drying out of the fixer composition in the fixer nozzle of the inkjet printing system. In an example, the non-VOC solvent can be a water soluble organic solvent. The examples of such organic solvents include 2-ethyl-2-hydroxymethyl-1,3-propanediol, glycerol propoxylate, tripropylene glycol, 1-(2-hydroxy ethyl)-2-pyrrolidinone, 1-(2-hydroxyethyl)-2-imidaZolidinone, or a combination thereof. Examples of other suitable solvents include amine-N-oxide, ethylene glycol, diethylene glycol, triethylene glycol, 1-propoxy-2-propanol or a combination thereof. In an example, the non-VOC solvent can be tetraethylene glycol. In said example, the fixer composition can include about 3% to 15% of the solvent by weight. In another case, the fixer composition can include an amount of about 10% to 12% of the solvent by weight. In another case, the suitable solvents for use in the fixer liquid vehicle can include VOCs, except for amine-N-oxide.

According to an aspect, the metal salt dispersed in the fixer liquid vehicle to form the fixer composition can be a polyvalent metal salt. The polyvalent metal salt component can be combination of a divalent or a higher polyvalent metallic ion and an anion. In some examples, the polyvalent metal salt component is soluble in water. Examples of polyvalent metallic ions include divalent metallic ions, such as $Ca^{2+}$, $Cu^{2+}$, $Ni^{2+}$, $Mg^{2+}$, $Zn^{2+}$, or $Ba^{2+}$; trivalent metallic ions, such as $A^{3+}$, $Fe^{3+}$, and $Cr^{3+}$. Examples of anions used in the metal salt can include $Cl^-$, $I^-$, $Br^-$, $NO_3^-$, or $RCOO^-$, where R can be Hydrogen or any hydrocarbon chain. In one example, the metal salt can be a calcium salt, say calcium propionate ($Ca(C_2H_5COO)_2$). According to an aspect, the fixer composition can include about 5% to 10% of the metal salt by weight. In an example, the amount of metal salt in the fixer composition can be about 7% to 9% by weight.

In addition, the fixer liquid vehicle can include a surfactant to lower the surface tension of the substrate when applied on the substrate during printing. In one example, the surfactant can include non-ionic surfactant, cationic surfactant or a combination thereof. In one case, the surfactants can be non-ionic surfactants selected from a nonionic fluorosurfactant, nonionic acetylenic diol surfactant, nonionic ethoxylated alcohol surfactant or a combination thereof. In another example, several commercially available nonionic surfactants may be used in the fixer composition. The examples of such commercially available surfactants include ethoxylated alcohols, such as those from the Tergitol® series, say Tergitol® 15S30 or Tergitol® 15S9; surfactants from the Surfynol® series say, Surfynol® 440 or Surfynol® 465; fluorinated surfactants, such as those from the Zonyl® family, say Zonyl® PS0 and Zonyl® FSN surfactants; fluorinated PolyFox® nonionic surfactants, say PF159 nonionic surfactants; or a combination thereof.

In another case, the fixer composition can include a suitable cationic surfactants, such as long chain amines, their salts, or combination thereof; acrylated diamines; polyamines, their salts, or combination thereof; quaternary ammonium salts; polyoxyethylenated long-chain amines; quaternized polyoxyethylenated long-chain amines; or combinations thereof. In one case, cationic surfactants which are stable in the pH range of the fixer composition can be used.

In one case, the surfactant can be Surfynol® SEF. In such a case, the fixer composition can include about 0.01% to 1% of the surfactant by weight. In another case, the fixer composition can include an amount of about 0.03% to 1% by weight.

Furthermore, the fixer composition can include an acid buffer for maintaining the pH of the fixer composition below 7; for instance, in a range of about 6 to 6.6. As explained previously, the pH of the fixer composition is responsible for providing a conducive environment for the reaction between the colorants and the metal salts to occur, for obtaining good quality prints on the substrate. In one example, the acid buffer can be methanesulfonic acid. In said example, the fixer composition can include about 0.05% to 5% of the acid buffer by weight. In one case, the fixer composition can include about 0.05% to 2% of the acid buffer by weight.

In addition to the above compounds, the fixer composition may include wetting agents, de-foamers, polymers, organic compounds, biocides sequestering agents, viscosity modifiers, surface-active agents, chelating agents, resins, or a combination thereof, to enhance various properties of the fixer composition.

According to another implementation, any inkjet printing system can be retrofitted with the ink composition and the fixer composition of the present subject matter, and can be used for high speed printing. As explained above, the prints so achieved are glossy, durable, and substantially resistant to wet rub, dry rub, and smearing.

The preceding description has been presented only to illustrate and describe certain implementations of the present subject matter. Although certain methods and compositions have been described herein as examples, the scope of coverage of this patent is not limited thereto. On the contrary, the present subject matter covers all methods and compositions fairly falling within the scope of the claims either literally or under the doctrine of equivalents.

EXAMPLES

Ingredients and Abbreviations

Polyurethane binder is a water soluble binder used in general ink compositions.

The 2HE2P solvent is a non-VOC decap solvent used in the ink compositions of the present subject matter for preventing drying of the ink composition in the ink nozzles.

Dantocol® DHE solvent is non-VOC decap solvent used in the general ink compositions to prevent drying of the ink composition in the ink nozzles.

Surfynol® SEF is a surfactant to wet the substrate and promote ink dot gain used in the general ink compositions. TegoWet® 510 surfactant is a surfactant to wet offset media and promote ink dot gain employed in the ink compositions of the present subject matter.

2-Pyrrolidone solvent and MPDiol® solvent are both toxic, VOC decap solvents used in the general ink compositions to prevent dryout in the ink nozzles.

Tergitol® 15s7 surfactant and Byk® 348 surfactant are both surfactants designed for use in general ink compositions used on vinyl substrates.

Kordex® MLX and Proxel® GXL are preservatives used in the ink compositions and the fixer compositions of the present subject matter as well as in the general ink compositions.

Further, tetraethylene glycol is a non-VOC solvent which prevents the fixer composition from drying in the fixer nozzle.

Tergitol® 15-S-30 is a surfactant used for printing on plain porous paper to control surface tension on the surface of the plain porous paper.

In addition, methanesulfonic acid is used as an acid buffer to maintain the pH of the fixer composition below 7.

DI water refers to deionized water. In one example, DI water can be deionized distilled water.

Example 1

Ink compositions, ink A to ink G, are prepared in accordance with the constituents provided in table 1 below. As an example, the compositions provided in table 1 are in terms of percentage by weight (% by weight).

TABLE 1

Ink Compositions

| Ingredients | Ink A | Ink B | Ink C | Ink D | Ink E | Ink F | Ink G |
|---|---|---|---|---|---|---|---|
| Pigment Black | 2.5 | 2.5 | 3.0 | 3.0 | 3.0 | 3.0 | 3.0 |
| Polyurethane binder | 0.75 | 0 | 0 | 0 | 0 | 0 | 0 |
| 2HE2P solvent | 1.5 | 0 | 12.0 | 12.0 | 12.0 | 12.0 | 12.0 |
| Dantocol ® DHE solvent | 8.0 | 0 | 0 | 0 | 0 | 0 | 0 |
| Surfynol ® SEF | 0.85 | 0 | 0 | 0 | 0 | 0 | 0 |
| TegoWet ® 510 surfactant | 0 | 0 | 0.45 | 0.45 | 0.45 | 0.45 | 0.45 |
| Latex A | 0 | 6.0 | 1.5 | 0 | 0 | 0 | 0 |
| Latex B | 0 | 0 | 0 | 3.0 | 0 | 0 | 0 |
| Latex C | 0 | 0 | 0 | 0 | 3.0 | 0 | 0 |
| Latex D | 0 | 0 | 0 | 0 | 0 | 3.0 | 0 |
| Latex E | 0 | 0 | 0 | 0 | 0 | 0 | 3.0 |
| 2-Pyrrolidone solvent | 0 | 16.0 | 0 | 0 | 0 | 0 | 0 |
| MPDiol ® solvent | 0 | 9.0 | 0 | 0 | 0 | 0 | 0 |
| Tergitol ® 15s7 surfactant | 0 | 0.5 | 0 | 0 | 0 | 0 | 0 |
| Byk ® 348 surfactant | 0 | 1.0 | 0 | 0 | 0 | 0 | 0 |
| Kordek ® MLX | 0.14 | 0 | 0.14 | 0.14 | 0.14 | 0.14 | 0.14 |
| Proxel ® GXL | 0.18 | 0 | 0.10 | 0.10 | 0.10 | 0.10 | 0.10 |
| DI Water | balance | balance | Balance | balance | balance | balance | balance |

Table 1, above, shows constituents of six different ink compositions, namely, ink A, ink B, ink C. ink D, ink E, and ink F. While ink A and ink B are inks generally used in inkjet printing systems, ink C, ink D, ink E, and ink F are ink compositions as per the present subject matter.

As illustrated in table 1, the black pigment is the colorant in the ink composition.

Further, latex A is a copolymer of styrene monomers and acrylic monomers and used in ink C, which is one of the ink compositions of the present subject matter. Latex has an acid number below 10 and is dispersed in an anionic sulfate surfactant. The glass transition temperature of latex A is about 106° C. and the particle size is about 220 nm.

Latex B is a copolymer of styrene monomers and acrylic monomers and is used in ink D which is a composition in accordance with the present subject matter. The acid number of latex B is below 10 and is dispersed with an anionic sulfate surfactant. Further, latex B and has a glass transition temperature in a range of about of 76° C. and a particle size of about 135 nm.

Latex C is a copolymer of styrene monomers and acrylic monomers and is used in ink E which is a composition in accordance with the present subject matter. The acid number of latex C is below 10 and is dispersed with an anionic sulfate surfactant. Further, latex C and has a glass transition temperature in a range of about 65° C. and a particle size of about 135 nm.

Latex D is used in ink F of the present subject matter. Latex D is a copolymer of styrene monomers and acrylic monomers and has an acid number of below 10. Further, latex D particles are dispersed with anionic sulfonate surfactant, have a glass transition temperature of about 85° C., and a particle size of about 183 nm.

Further, latex E is used in ink G of the present subject matter. Latex E is a copolymer of styrene monomers and acrylic monomers and has an acid number of below 10. Additionally, latex E particles are dispersed with an anionic sulfonate surfactant and have a glass transition temperature of about 85° C., and a particle size of about 171 nm.

Example 2

Fixer compositions, fixer A and B, are prepared in accordance with table 2 below. As an example, the compositions provided in table 1 are in terms of percentage by weight (% by weight).

TABLE 2

Fixer Compositions

| Ingredients (% by weight) | Fixer A | Fixer B |
|---|---|---|
| Calcium propionate | 6.5 | 8.38 |
| Tetraethylene glycol | 12 | 12 |
| Tergitol ® 15-S-30 | 0.3 | 0 |
| Surfynol ® SEF | 0 | 0.05 |
| Methanesulfonic acid | 0.15 | 0.15 |
| Kordek ® MLX | 0.01 | 0.01 |
| Proxel ® GXL | 0.05 | 0.05 |
| DI Water | balance | balance |

In table 2, fixer A is the generally used fixer composition and fixer B is the fixer composition of with the present subject matter. As shown in table 2, calcium propionate is the metal salt responsible for the flocculation of the colorant on the substrate at the time of printing to control migration of the colorant. As can be seen, fixer B uses a greater amount of calcium propionate than the generally used fixer A. Consequently, during printing/operation, the flocculation of the colorant takes place rapidly when the ink composition is used along with fixer B. Therefore, as explained previously, the use of fixer B allows for high speed printing.

Tests and Results

In the present case, glossy coated offset media and porous uncoated paper are used for comparing the print performance of the above combinations of ink compositions and fixer compositions. The equipment used for printing included a prototype printer with a media conveyer and ink nozzle positions selected to simulate high speed printing. The media conveyor was set at a speed of about 100 fpm. In addition, infrared (IR) drying and convection drying techniques were used for drying the print.

Further, for testing the print performance, wet rub performances of prints on the above two substrates are tested with a Taber® linear abrader using a water wet cloth to wipe the printed matter in one 2" cycle with a force of about 250 grams (g). In addition, a change in the optical density of black print on the two substrates as a result of abrasion or rubbing is determined. In an example, the optical density is measured and recorded before and after each abrasion with an X-rite® spectrophotometer.

Table 3 illustrates a comparison of performance characteristics of different combinations of ink compositions and fixer compositions, as an example of the present subject matter.

TABLE 3

Performance Characteristics

| Combination tested | WR SUG | WR AO | KOD Δ SUG | KOD Δ AO |
|---|---|---|---|---|
| Combination 1: Ink A and Fixer A | 0.76 | 0.47 | 1.59 | 1.12 |
| Combination 2: Ink B and Fixer B | 0.04 | 0.13 | 1.45 | 0.77 |
| Combination 3: Ink C and Fixer B | 0.29 | 0.32 | 1.71 | 1.17 |
| Combination 4: Ink D and Fixer B | 0.00 | 0.29 | 1.58 | 1.20 |
| Combination 5: Ink E and Fixer B | 0.00 | 0.27 | 1.73 | 1.20 |
| Combination 6: Ink F and Fixer B | 0.20 | 0.49 | 1.72 | 1.16 |
| Combination 7: Ink G and Fixer B | 0.00 | 0.29 | 1.73 | 1.25 |
| Combination 8: Ink H and Fixer B | 0.12 | 0.18 | 1.72 | 1.17 |

In table 3, SUG stands for Sterling UltraGloss® which is a glossy coated offset media and AO stands for Accent Opaque® which is porous uncoated paper, used for comparing the print performance of the combinations of ink compositions and fixer compositions. Further, WR stands for wet rub performance and KOD Δ represents a change in the optical density of black print as a result of abrasion or rubbing. The results in table 3 are pictorially illustrated in a graph in FIG. 2.

The results demonstrate that the generally used ink A combined with fixer A has poor wet rub properties on SUG as well as AO. Further, the generally used ink B combined with fixer B has good wet rub properties but low optical density on uncoated porous paper based media. In addition, the combination of the generally used ink B and fixer B has good rub properties on SUG and fairly good optical density on SUG. However, the presence of large amounts of VOC solvent, 2-Pyrrolidone solvent, makes this ink composition toxic and affects the performance of the ink nozzle of the inkjet printing system 100.

Further, the results suggest that the combination of each of the ink compositions from ink C through ink G with fixer B as per the present subject matter has good wet rub properties and high optical density on SUG, in comparison to the generally used ink A. In addition, such combinations of the ink and fixer compositions in accordance to the present subject matter has good wet rub properties on AO with respect to ink A.

Figure 3:
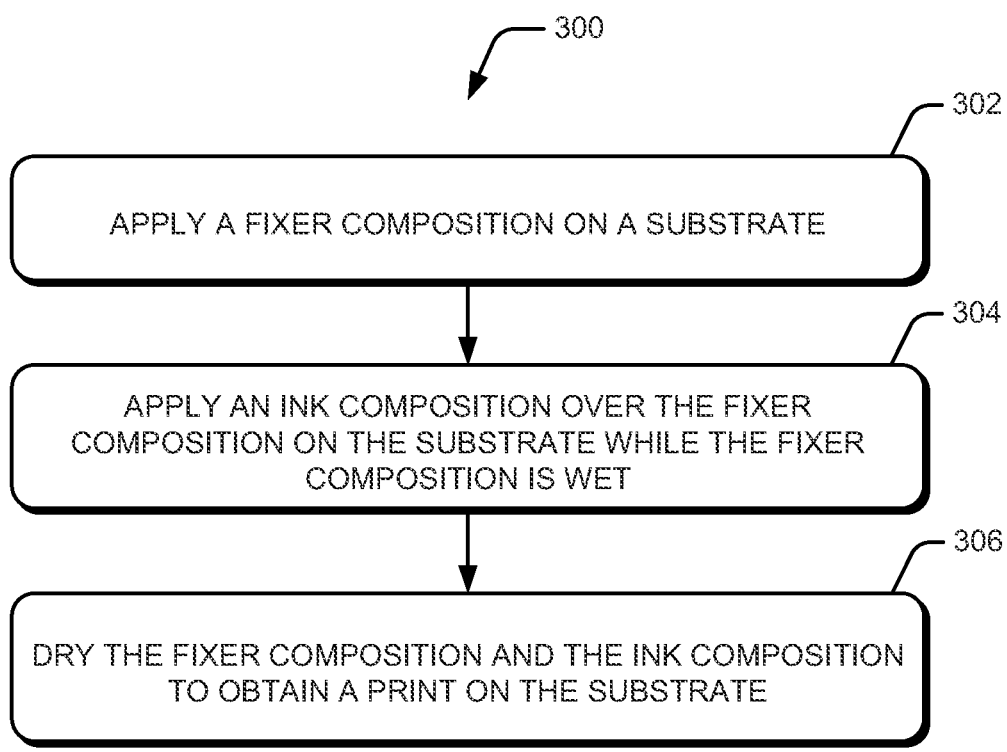
FIG. 3 illustrates a method for printing in the inkjet printing system, in accordance with an implementation of the present subject matter.

FIG. 3 illustrates a method 300 for printing in the inkjet printing system 100, in accordance with an implementation of the present subject matter. The order in which the method is described is not intended to be construed as a limitation, and any number of the described method blocks can be combined in any order to implement the method or any alternative method. Additionally, individual blocks may be deleted from the method without departing from the spirit and scope of the subject matter described herein. Furthermore, the method can be implemented in any suitable hardware, software, firmware, or combination thereof.

At block 302, a fixer composition is applied on a substrate. In one example, the fixer composition can include a metal salt, say calcium propionate, in a range of about 7% to 9% by weight. Further, the fixer composition can have a pH in a range of about 6 to 6.6. In addition, the substrate can be a slow-absorbing printing medium.

At block 304, an ink composition is applied over the fixer composition on the substrate while the fixer composition is wet. In an example, the ink composition can include a liquid vehicle having a non-volatile organic solvent. The liquid vehicle can serve as a dispersant for a colorant and a latex binder in the ink composition. In an example, the latex binder can have a glass transition temperature in a range of about 60° C. to 80° C. and an acid number in a range of about 0 to 20.

At block 306, the fixer composition and the ink composition applied on the substrate is dried to obtain a print on the substrate. In an example, the drying is achieved by exposing the substrate and the compositions thereon to a temperature of about 70° C.

Although implementations of the inkjet printing system and the method for printing therein have been described in terms of certain structural features and/or methods, the present subject matter is not limited to the features or methods described. Rather, the features and methods are disclosed and explained in the context of a few implementations of the inkjet printing system and the method for printing therein.

We claim:

1. An inkjet printing system, comprising:
   a fixer dispensing unit for applying a fixer composition on a substrate, wherein the fixer composition comprises a metal salt in a range of about 7% to 9% by weight, wherein the metal salt is dispersed in a fixer liquid vehicle and the metal salt is calcium propionate;
   an ink dispensing unit for applying an ink composition on the substrate, wherein the ink dispensing unit is positioned downstream of the fixer dispensing unit for wet-on-wet printing of the ink composition over the fixer composition, wherein the ink composition comprises
      a liquid vehicle having distilled water as a solvent and a non-volatile organic solvent as a co-solvent,
      a colorant dispersed in the liquid vehicle, and
      a latex binder dispersed in the liquid vehicle, wherein the latex binder has a glass transition temperature in a range of about 60° C. to about 80° C.; and
   a drying unit downstream of the ink dispensing unit to heat the substrate such that the latex forms a film over the colorant and mixes with the colorant on the substrate.

2. The inkjet printing system as claimed in claim 1, wherein the latex binder is a polymer of a styrene monomer.

3. The inkjet printing system as claimed in claim 1, wherein the fixer dispensing unit is provided upstream of the ink dispensing unit.

4. The inkjet printing system as claimed in claim 1, wherein the latex binder has a glass transition temperature in a range of about 60° C. to 80° C.

5. The inkjet printing system as claimed in claim 1, wherein the latex binder has an acid number in a range of about 0 to 20.

6. The inkjet printing system as claimed in claim 5, wherein the latex binder has an acid number in a range of about 3 to 10.

7. The inkjet printing system as claimed in claim 1, wherein the latex binder has a particle size in a range of about 120 nm to 190 nm.

8. The inkjet printing system as claimed in claim 1, wherein printing speed of the inkjet printing system is in a range of about 100 feet per minute (fpm) to 1000 fpm.

9. A method for printing in an inkjet printing system, the method comprising:
   applying a fixer composition on a substrate, the fixer composition comprising a metal salt in a range of about 7% to 9% by weight, wherein the metal salt is dispersed in a fixer liquid vehicle and the metal salt is calcium propionate;
   applying an ink composition over the fixer composition on the substrate while the fixer composition is wet, wherein the ink composition comprises
      a liquid vehicle having distilled water as a solvent and a non-volatile organic solvent as a co-solvent,
      a colorant dispersed in the liquid vehicle, and
      a latex binder dispersed in the liquid vehicle, wherein the latex binder has
   a glass transition temperature in a range of about 60° C. to about 80° C.; and
   drying the fixer composition and the ink composition and heating the substrate such that the latex forms a film over the colorant and mixes with the colorant on the substrate to obtain a print on the substrate.

10. The method as claimed in claim 9, wherein the fixer composition has a pH in a range of about 6 to 6.6.

11. The method as claimed in claim 9, wherein the substrate is coated offset media.

12. The inkjet printing system as claimed in claim 1, wherein the fixer composition and the ink composition are devoid of volatile organic solvents.

\* \* \* \* \*